US010482901B1

(12) United States Patent
Maurer et al.

(10) Patent No.: US 10,482,901 B1
(45) Date of Patent: Nov. 19, 2019

(54) SYSTEM AND METHOD FOR BEEP DETECTION AND INTERPRETATION

(71) Applicant: Alarm.com Incorporated, Tysons, VA (US)

(72) Inventors: Kevin Maurer, Tysons, VA (US); Alison Jane Slavin, Falls Church, VA (US); Innocent Djiofack, Tysons, VA (US); Stephen Trundle, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

(21) Appl. No.: 16/147,333

(22) Filed: Sep. 28, 2018

Related U.S. Application Data

(60) Provisional application No. 62/565,063, filed on Sep. 28, 2017.

(51) Int. Cl.
*H04R 29/00* (2006.01)
*G10L 25/51* (2013.01)
*G06N 3/08* (2006.01)

(52) U.S. Cl.
CPC .............. *G10L 25/51* (2013.01); *G06N 3/08* (2013.01); *H04R 29/00* (2013.01)

(58) Field of Classification Search
CPC .......... H04R 3/00; H04R 27/00; H04R 29/00; H04R 29/001; H04R 29/004; H04R 29/007; G10L 25/51; G10L 15/00; G10L 15/02; G10L 15/08; G10L 25/78; G10L 21/028; G06N 3/08; G05B 2219/37337; G05B 2219/37433; G05B 19/042; G05B 19/0428; G05B 19/406
See application file for complete search history.

(56) References Cited

U.S. PATENT DOCUMENTS

| | | | |
|---|---|---|---|
| 7,919,707 B2 | 4/2011 | Harvey et al. | |
| 8,917,186 B1 * | 12/2014 | Grant | G08B 29/126 340/692 |
| 9,143,875 B2 | 9/2015 | Ozcan | |
| 9,948,469 B2 | 4/2018 | Lu et al. | |
| 2003/0058101 A1 * | 3/2003 | Watanabe | G08B 13/1418 340/540 |
| 2007/0121918 A1 | 5/2007 | Tischer | |

(Continued)

*Primary Examiner* — Thang V Tran
(74) *Attorney, Agent, or Firm* — Fish & Richardson P.C.

(57) ABSTRACT

Methods, systems, and apparatus, including computer programs encoded on a storage device, for beep detection and interpretation is disclosed. In one aspect, a monitoring system is disclosed that includes a processor and a storage device storing instructions that, when executed by the processor, causes the processor to perform operations. The operations may include obtaining sound data of audio sounds detected by a microphone that is located at the property, determining whether the sound data includes data representing one or more audio tones generated by a device, based on determining that the obtained sound data includes one or more audio tones generated by a device, generating an audio fingerprint of the sound data, determining, using the generated audio fingerprint, a state of the device that generated the one or more audio tones, and performing an operation based on the state of the device that generated the one or more audio tones.

20 Claims, 4 Drawing Sheets

(56) References Cited

U.S. PATENT DOCUMENTS

| | | | |
|---|---|---|---|
| 2009/0150149 A1 | 6/2009 | Culter et al. | |
| 2009/0251310 A1* | 10/2009 | Bloebaum | G08B 21/0208 340/539.11 |
| 2011/0157369 A1 | 6/2011 | Pederson | |
| 2011/0246124 A1* | 10/2011 | Lill | G05B 19/0428 702/141 |
| 2012/0214515 A1* | 8/2012 | Davis | H04W 4/023 455/456.3 |
| 2013/0106613 A1* | 5/2013 | Lee | H04W 4/021 340/691.3 |
| 2013/0345843 A1 | 12/2013 | Young et al. | |
| 2015/0112678 A1 | 4/2015 | Binks et al. | |
| 2015/0294553 A1* | 10/2015 | Logan | G05B 19/042 340/539.1 |
| 2016/0091398 A1* | 3/2016 | Pluemer | G05B 19/4065 702/183 |
| 2017/0083494 A1* | 3/2017 | Kim | G06F 3/167 |
| 2017/0176961 A1* | 6/2017 | Tirpak | G05B 15/02 |
| 2017/0287500 A1 | 10/2017 | De Mers et al. | |
| 2018/0158288 A1* | 6/2018 | Logan | G08B 1/08 |
| 2018/0303730 A1* | 10/2018 | Chen | A61K 8/347 |
| 2018/0330589 A1* | 11/2018 | Horling | G08B 13/1672 |

* cited by examiner

SYSTEM AND METHOD FOR BEEP DETECTION AND INTERPRETATION

CROSS-REFERENCE TO RELATED APPLICATION

This application claims the benefit of U.S. Provisional Patent Application No. 62/565,063 filed Sep. 28, 2017, and entitled "System and Method For Beep Detection and Interpretation," which is incorporated herein by reference in its entirety.

BACKGROUND

A property such as a single family home, a townhouse, an apartment, a commercial building, an industrial building, or the like may contain a plurality of devices. In some instances, one or more of the plurality of devices contained by the property may output a set of one or more audio tones. The audio tones may include a plurality of short, high-pitched sounds commonly referred to as "beeps." Each of the plurality of short, high-pitched sounds in a particular set of audio tones can have distinguishing characteristics in audio tone length, audio tone volume, audio tone pitch, and time between respective pairs of audio tones.

SUMMARY

According to one innovative aspect of the present disclosure, a system, method, apparatus, and computer program is disclosed for beep detection and interpretation is disclosed. In one aspect, a monitoring system for monitoring a property is disclosed that includes one or more processors and one or more storage devices, the one or more storage devices storing instructions that, when executed by the one or more processors, cause the one or more processors to perform operations. The operations ma include obtaining, by the monitoring system, sound data of audio sounds detected by a microphone that is located at the property, determining, by the monitoring system, whether the sound data includes data representing one or more audio tones generated by a device, based on determining that the obtained sound data includes one or more audio tones generated by a device, generating, by the monitoring system, an audio fingerprint of the sound data, determining, by the monitoring system and using the generated audio fingerprint, a state of the device that generated the one or more audio tones, and performing, by the monitoring system, one or more operations based on the state of the device that generated the one or more audio tones.

Other aspects include corresponding methods, apparatus, and computer programs to perform actions of methods defined by instructions encoded on computer storage devices.

These and other versions may optionally include one or more of the following features. For instance, in some implementations, the operations may further include extracting, by the monitoring system, the one or more audio tones from the sound data.

In some implementations, generating, by the monitoring system, an audio fingerprint, of the sound data, may include generating, by the monitoring system, the audio fingerprint based on one or more of (i) a frequency or pattern of the one or more extracted audio tones, (ii) a loudness of the one or more extracted audio tones, (iii) a duration of each of the one or more extracted audio tones, (iv) a pattern of the one or more extracted audio tones, or (v) a duration and pattern of the one or more extracted audio tones in the obtained sound data.

In some implementations, the operations may further include obtaining, by the monitoring system, second sound data of audio sounds detected by a microphone that is located at the property, based on determining, by the monitoring system, that the obtained second sound data does not include one or more audio tones generated by a device, obtaining, by the monitoring system, additional sound data of audio sounds detected by the microphone that is located at the property, and determining, by the monitoring system and based on the additional sound data, whether the additional sound data includes one or more audio tones generated by a device.

In some implementations, obtaining sound data of audio sounds detected by a microphone that is located at the property comprises recording, using the microphone, audio sounds at the property.

In some implementations, obtaining sound data of audio sounds detected by a microphone located at the property comprises receiving, by the monitoring system, a recording of audio sounds that occurred at the property.

In some implementations, determining, by the monitoring system, whether the sound data includes data representing one or more audio tones may include providing, by the monitoring system, the sound data as an input to a machine learning model that has been trained to determine whether sound data includes one or more audio tones generated by a device, receiving, by the monitoring system, an output from the machine learning model that indicates whether the detected sound data includes the one or more audio tones generated by the device, and determining, by the monitoring system and based on the received output from the machine learning model, whether the sound data includes the one or more audio tones generated the device.

In some implementations, determining, by the monitoring system and using the generated audio fingerprint, a state of the device that generated the one or more audio tones may include generating, by the monitoring system, a query that includes the generated audio fingerprint as a search parameter, and obtaining, by the monitoring system and in response to the generated query, data that identifies (i) a device identifier of the device that generated the one or more audio tones and (ii) the state of the device.

In some implementations, the operations may further include determining, by the monitoring system, a particular operation to perform based on (i) the device identifier and (ii) the state of the device. In such implementations, performing one or more operations, by the monitoring system, based on the state of the device that generated the one or more audio tones may include transmitting, by the monitoring system, a notification that prompts the user to perform the particular operation.

In some implementations, the operations may further include determining, by the monitoring system, a particular operation to perform based on (i) the device identifier and (ii) the state of the device. In such implementations, performing one or more operations, by the monitoring system, based on the state of the device that generated the one or more audio tones may include transmitting, by the monitoring system, an instruction to a component of the monitoring system to perform the particular operation.

In some implementations, determining, by the monitoring system, whether the sound data includes data representing one or more audio tones generated by a device may include determining, by the monitoring system, whether the sound data includes data representing one or more audio tones generated by a speaker of the device.

These, and other, implementations are described in more detail below in detailed description and in the drawings.

DETAILED DESCRIPTION

The present disclosure provides a system and method for detecting and interpreting a set of one or more audio tones (hereinafter "audio tones."). The set of audio tones may include, for example, one or more beeps output by a device residing in a property. A listening device residing at the property can detect the set of audio tones, determine the origin of the set of audio tones, determine a meaning (if any) associated with the detected set of audio tones, and perform one or more operations based on the detected audio tones. For example, the listening device may generate a notification that identifies (i) the device that is the origin of the set of audio tones, (ii) the meaning of the set of audio notes, (iii) an indication that the meaning of the set of audio tones is unknown, (iv) or a combination thereof. Alternatively, or in addition, the detected set of audio tones (or its determined meaning) may cause one or more events to occur.

In some implementations, the listening device that detects the set of audio tones may be separate from a different device that performs analysis of the audio tones. For example, a listening device may detect a set of audio tones, and then relay the set of audio tones (or a representation thereof) to a different device such as a monitoring unit (e.g., a monitoring system control unit or a monitoring application server). Then, the monitoring unit can receive the set of the audio tones (or a representation thereof) and analyze the received set of audio tones (or a representation thereof). Analyzing the set of audio tones may include determining the origin of the set of audio tones, determining a meaning (if any) associated with the detected set of audio tones, or a combination thereof. Determining the meaning of the detected set of audio tones may include, for example, determining a state of the device that generated by the set of audio tones. The monitoring unit may then perform one or more operations based on the detected audio tones. For example, the monitoring unit may generate a notification that identifies (i) the device that is the origin of the set of audio tones, (ii) the meaning of the set of audio notes (e.g., a state of the device that generated the set of audio tones), (iii) an indication that the meaning of the set of audio tones is unknown, (iv) or a combination thereof. Alternatively, or in addition, the detected set of audio tones (or its determined meaning) may cause one or more events to occur.

Figure 1:
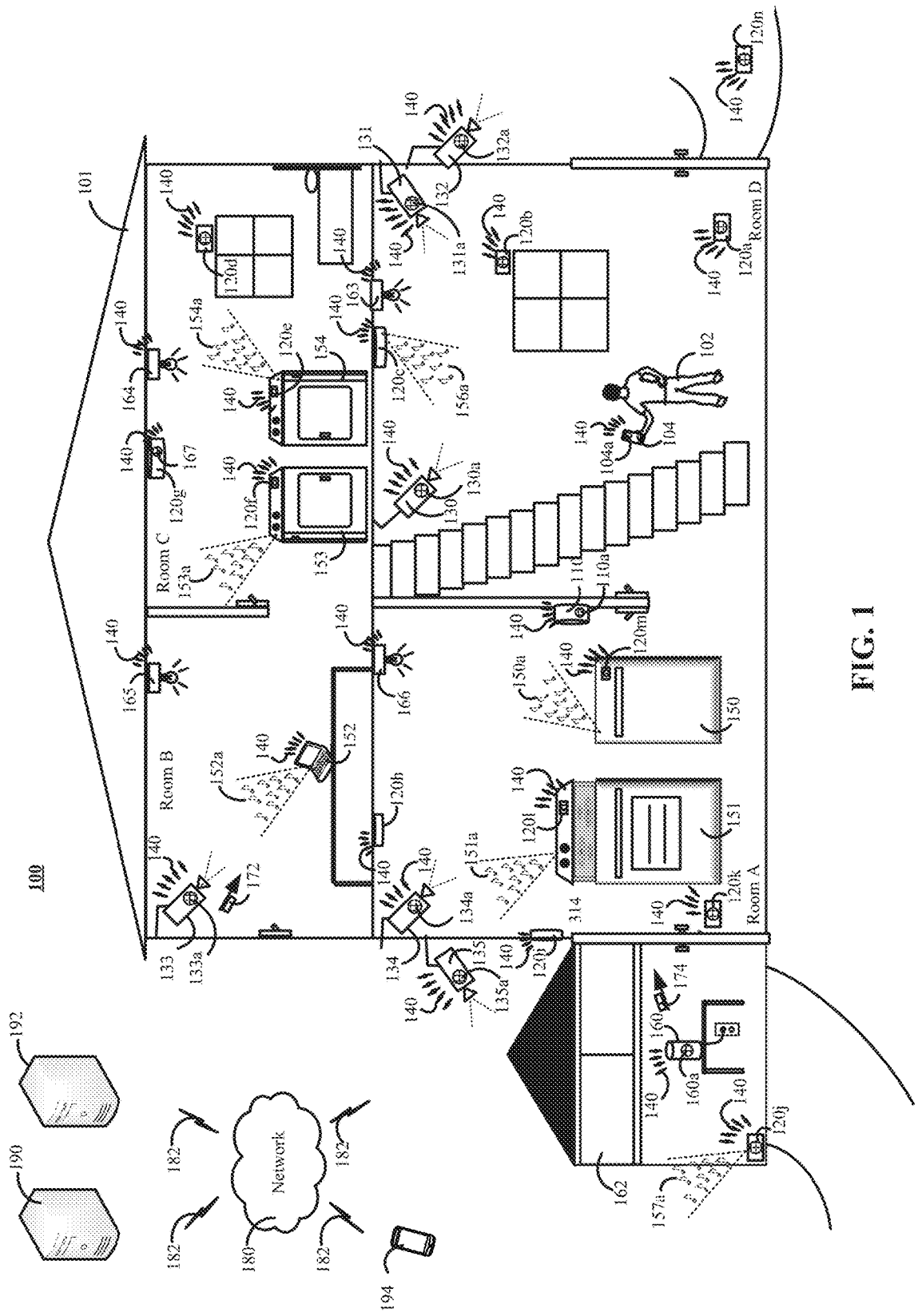
FIG. 1 is a contextual diagram of an example of a monitoring system for detecting and interpreting audio tones.

FIG. 1 is a contextual diagram of an example of a monitoring system 100 for detecting and interpreting audio tones.

The monitoring system 100 includes at least a monitoring system control unit 110, one or more sensors 120a, 120b, 120c, 120d, 120e, 120f, 120g, 120h, 120i, 120j, 120k, 120l, 120m, 120n, one or more devices 150, 151, 152, 153, 154 that can output a set of audio tones 150a, 151a, 152a, 153a, 154a (hereinafter "devices"), and a local network 140. The local network 140 may include one or more of a LAN, a WAN, a Wi-Fi network, a cellular network (e.g., 3G, 4G, CAT-M, 5G), a Z-wave network, a ZigBee network, the Internet, or a combination thereof, that are each respectively used for network communication by one or more components of the monitoring system 100. One or more portions of the local network 140 may be wired, one or more portions of the local network 140 may be wireless, or the location network can include both. In some implementations, the devices may also include one or more of the sensors 120a, 120b, 120c, 120d, 120e, 120f, 120g, 120h, 120i, 120j, 120k, 120l, 120m, 120n such as sensors 120c, 120j that can output a set of audio tones 156a, 157a.

In some implementations, the monitoring system 100 may also include one or more cameras 130, 131, 132, 133, 134, 135, a home assistant 160, one or more connected light bulbs 163, 164, 165, 166, a remote network 180, one or more communications links 182, a monitoring application server 190, a central alarm station server 192, a remote user device 194, a local user device 104, or a combination thereof. The remote network 180 may include a LAN, a WAN, a cellular network, the Internet, or the like. In some implementations, the remote network 180 may a wireless network such as a cellular network, or the like. Alternatively, one or more portions of the remote network 180 may also be implemented using wired network such as an Ethernet network, a cable network, a fiber optic network, or the like.

The monitoring system 100 may include one or more listening devices. For example, one or more of the aforementioned monitoring system 100 components may include a microphone. By way of example, the monitoring system control unit 110 may include a microphone 110a, one or more of the respective cameras may include a respective microphone 130a, 131a, 132a, 133a, 134a, 135a, the home assistant 160 may include a microphone 160a, a user device 104 may include a microphone 104, or the like. In some implementations, one or more sensors 120a, 120b, 120c, 120d, 120e, 120f, 120g, 120h, 120i, 120j, 120k, 120l, 120m, 120n such as sensor 120g may also include a microphone 167. The term "listening device" as used herein may include any one of the aforementioned components of monitoring system 100 that is equipped with a microphone. In some implementations, the monitoring system 100 may use one or more of the listening devices to continuously listen for a set of audio tones.

By way of example, with reference to Room A of FIG. 1, a device such as a dishwasher 150 may output one or more sets of audio tones that each have a specific meaning. The specific meaning of each respective set of audio tones may indicate, for example, a state of the device that generated the set of audio tones. For example, the dishwasher 150 may output a first set of one or more audio tones when the door of the dishwasher 150 is opened, a second set of one or more audio tones when the door of the dishwasher 150 is closed, a third set of one or more audio tones when the dishwasher 150 finishes a wash cycle, a fourth set of one or more audio tones when the dishwasher 150 transitions from an initial rinse cycle to a wash cycle, or the like. In the example of FIG. 1, assume that the dishwasher 150 completes a wash cycle and outputs a set of audio tones 150a.

One or more listening devices such as the microphone 110a of the monitoring system control unit 110 are configured to continuously listen for sound data and determine whether the sound data includes a set of audio tones generated by a speaker of a device such as set of audio tones 150a generated by a speaker of the dishwasher 150. Sound data may include any types of sounds that can be generated in the property 101. For example, sound data may include sounds from persons, sounds from objects, sounds comprising a set of audio tones from a device, or the like. For example, microphone 110a of the monitoring system control unit 110 may periodically capture sound data in 3-second, 5-second, or 10-second increments and analyze the captured audio data to determine if the captured audio data includes a set of audio tones such a set of audio tones 150a. In some implementations, the sound data captured by the microphone 110a can be provided to a machine learning model that has been trained to predict the likelihood that a recording of captured sound data includes a set of audio tones such as a set of audio tones 150a. The machine learning model may include a neural network. The machine learning model may process the captured sound data and generate an output. The output of the machine learning model may include, for example, a probability that the recording of captured sound data that was input into the machine learning model includes a set of audio tones such as a set of audio tones 150a. Then, the monitoring system control unit 110 can determine whether the probability satisfies a predetermined threshold indicating that the captured sound data includes a set of audio tones. Alternatively, or in addition, the machine learning model may generate an output that classifies the input into one of two or more classifications such as (i) likely includes a set of audio tones or (ii) likely does not include a set of audio tones.

If the output of the machine learning model satisfies a predetermined threshold, then the monitoring system control unit 110 may determine that the recording of captured sound data processed by the machine learning model includes a set of audio tones such as a set of audio tones 150a. In such instances, the monitoring system control unit 110 can generate an audio fingerprint for at least a portion of the captured sound data. The audio fingerprint may include a representation of the captured sound data that can be used to search a database of audio fingerprints. The fingerprint for a recording of the captured sound data that includes a set of audio tones can be based on, for example, (i) the frequency/pattern of the set of audio tones in the captured sound data, (ii) the loudness of the set of audio tones in the captured sound data, (iii) a duration/pattern of the audio tones (e.g., 250 ms at 100 Hz, ~55 dB, 250 ms silent, 250 ms at 110 Hz, etc.) in the captured sound data, or a combination thereof. If the output of the machine learning model does not satisfy a predetermined threshold, then the monitoring system control unit 110 may determine that the recording of the captured sound data processed by the machine learning model does not include a set of audio tones such as audio tones 150a. In such instances, the monitoring system control unit 110 may discard the recording of the captured sound data, and not generate a fingerprint for the recording of the captured sound data nor perform a search of an audio fingerprint database.

The machine learning model may be stored on the monitoring system control unit 110, on another local listening device, or on a remote server such as the monitoring application server 190. When the machine learning model is stored on a remote server such as the monitoring application server 190, the monitoring system control unit 110 (or other listening device) may provide a recording of captured sound data to the monitoring application server 190 via one or more networks 140, 180, and one or more communication links. In such instances, the monitoring application server 190 may use the machine learning model in the manner identified above to obtain a prediction of the likelihood that the recording of captured sound data includes a set of audio tones such as a set of audio tones 150a. If the output of the machine learning model satisfies a threshold, the monitoring application server 190 may (i) transmit a message to the monitoring system control unit 110 indicating that the recording of the captured sound data includes a set of audio tones such as a set of audio tones 150a, (ii) generate and provide an audio fingerprint to the monitoring system control unit, or (iii) a combination thereof.

The aforementioned machine learning model can be used to determine whether captured sound data includes a set of audio tones prior to generating an audio fingerprint based on the captured sounds data. However, the present disclosure need not be so limited. For example, in some implementations, a monitoring system control unity 110, monitoring application server 190, or other component of the monitoring system 100 may generate an audio fingerprint and perform a search of one or more databases based on the audio fingerprint each time one or more listening devices detects captured sound data.

In the example of Room A in FIG. 1, the monitoring system control unit 110 can determine that a recording of captured sound data includes a set of audio tones 150a and generate an audio fingerprint for the set of audio tones 150a. The monitoring system control unit 110 can use the generated audio fingerprint to search one or more databases of audio fingerprints to determine a meaning of the set of audio tones 150a. Each of the one or more audio fingerprint databases may include a plurality of data records that each correspond to a particular set of audio tones that can be generated by a respective device. Each respective record may include, for example, a mapping of an audio fingerprint to (i) a device identifier, (ii) a meaning of a set of audio tones, or both.

The audio fingerprint database may be stored locally on the monitoring system control unit 110. In such instances, the search of the audio fingerprint database may include the monitoring system control unit 110a generating a query that includes the audio fingerprint of the set of audio tones 150a as a query parameter, performing a search of the monitoring system control unit's 110 local audio fingerprint database based on the generated query, and determining whether a record corresponding to the searched audio fingerprint exists in the local audio tone database.

If it is determined that the audio fingerprint database includes a record corresponding to the searched audio fingerprint (i.e., the audio fingerprint that was a parameter of the search query), then the monitoring system control unit 110a can retrieve (i) the device identifier of the device that output the set of audio tones associated with the audio fingerprint that was a parameter of the generated query, (ii) a meaning of the set of audio tones associated with the audio fingerprint that was a parameter of the search query, or both. If it is determined that the audio tone database does not include a record corresponding to the searched audio fingerprint (i.e., the audio fingerprint that was a parameter of the search query), then the monitoring system control unit 110a can transmit a message to a user device 104, 194 that prompts a legitimate occupant of the property 101 to add the searched audio fingerprint to the audio fingerprint database. The message may include a captured sound data (e.g., a recording) of the set of audio tones on which the audio fingerprint is based.

In the example of FIG. 1, the monitoring system control unit 110 can perform a search of a local audio fingerprint database based on the audio fingerprint of the set of audio tones 150a as a query parameter and identify a record mapping the audio fingerprint of the set of audio tones 150a to (i) a device identifier (e.g., dishwasher 150) and (ii) a meaning of the set of audio tones (e.g., wash cycle completed). In response to the identification of the meaning associated with the set of audio tones 150a, the monitoring system control unit 110 may perform one or more operations. For example, the monitoring system control unit 110 may generate a notification for transmission to a user device 104 that can notify the legitimate occupant 102 of the property 101 that the dishwasher 150 has completed a wash cycle. If the legitimate occupant 102 of the property 101 is located at the property 101, then the generated notification can be transmitted by the monitoring system control unit 110 to the user device 104 using the local network 140. Alternatively, or in addition, if one or more legitimate users are located remotely from the property 101, then the generated notification can be transmitted by the monitoring system control unit 110 to the remote user device 194 of a legitimate occupant of the property using the remote network 180.

In some implementations, the audio fingerprint database may be stored remotely on a remote server such as the monitoring application server 190. In such instances, the monitoring system control unit 110 may generate a query that includes the audio fingerprint of the set of audio tones 150a as a query parameter and transmit the generated query to the remote server such as monitoring application server 190 using one or more of network 140, network 180, and one or more communication links 182. The monitoring application server 190 can receive the query that was generated and transmitted by the monitoring system control unit 110 and perform a search of the monitoring application server's 190 audio fingerprint database that is remote from the monitoring system control unit 110 based on the query received from the monitoring system control unit 110, and determine whether a record corresponding to the searched audio fingerprint exists in the audio tone database that is remote from the monitoring system control unit 110.

If it is determined that the audio fingerprint database includes a record corresponding to the searched audio fingerprint, then the monitoring application server 190 can retrieve, and transmit to the monitoring system control unit 110, (i) the device identifier of the device that output the set of audio tones associated with the audio fingerprint that was a parameter of the generated query, (ii) a meaning of the set of audio tones associated with the audio fingerprint that was a parameter of the search query, or both. If it is determined that the remote audio tone database does not include a record corresponding to the searched audio fingerprint, then the monitoring system, then the monitoring system control unit 110a can transmit a message to a user device 104, 194 that prompts a legitimate occupant of the property 101 to add the searched audio fingerprint to the audio fingerprint database.

In some implementations, only one of the aforementioned searches can be performed (e.g., a search of the local audio fingerprint database, a search of the remote audio fingerprint database, but not both) based on a generated audio fingerprint. In some implementations, however, both of the aforementioned searches may be performed based on a generated audio fingerprint. For example, in some implementations, the local audio tone database may include a local library of records that each include a mapping of an audio fingerprint to (i) a device identifier, (ii) a meaning of a set of audio tones associated with the audio fingerprint, or both, for a respective device installed at the property at a particular time t. This may include, for example, a set of records representative of the respective sets of audio tones for every device installed at the property 101, residing at the property 101, or otherwise associated with the property 101 at the particular time t.

If a record is not identified during the search of the local audio fingerprint database that satisfies the search (e.g., by identifying a record with an audio fingerprint that matches the generated audio fingerprint within a predetermined margin of error), it may be an indication that the monitoring system control unit 110 does not have any records indicating that the device that generated the set of audio tones represented by the generated audio fingerprint is installed at the property 101, is currently residing at the property 101, or is otherwise associated with the property 101. In such instances, the monitoring system control unit 110 may perform a search of one or more remote audio fingerprint databases using a search query that includes the generated audio fingerprint as a search parameter.

The remote audio fingerprint databases may include records corresponding to audio fingerprints that correspond to devices installed in multiple different properties, audio fingerprints for multiple different device models provided by a manufacturer of the different models, audio fingerprints for multiple different devices uploaded by a user, or the like. In some implementations, the remote audio fingerprint database may include an audio fingerprint for each known device that can be installed at a property. If a search of the remote database identifies an audio fingerprint record that satisfies the search (e.g., by identifying a record with an audio fingerprint that matches the generated audio fingerprint within a predetermined margin of error), then the server hosting the remote database may obtain information from the record such as (i) a device name, (ii) a meaning of a set of audio tones (e.g., a device state associated with the set of audio tones), or both and transmit this obtained information to the monitoring system control unit 110.

Alternatively, or in addition, in some implementations, the monitoring system control unit 110 or the monitoring application server 190 may transmit data to a device 104, 194 of a legitimate occupant of the property 101 to initiate display of a user interface that asks a legitimate occupant whether a record corresponding to generated audio fingerprint should be added to the local database maintained by the monitoring system control unit 110. For example, the user interface of the user device may ask a legitimate occupant 102 of the property 101 whether the legitimate owner of the property 101 recently purchased, installed, or the like a device identified as being associated with the generated audio fingerprint used to search the remote database. In such instances, the legitimate occupant of the property can respond "yes" in order to have the record corresponding to the generated audio fingerprint be added to the local database. In such instances, the legitimate occupant 102 of the property 101 can also be prompted to input data related to the device that generated the set of audio tones corresponding to the generated audio fingerprint. For example, the legitimate occupant 102 of the property 101 may be asked to input a device identifier, a meaning of the set of audio tones (e.g., a device state), or the like. The notification may allow the user to playback the set of audio tones so that the user can determine the information related to the set of audio tones. Alternatively, the legitimate occupant 102 of the property 101 can respond "no" in order to have the monitoring system control unit 110 not add the generated audio fingerprint to the local database.

By way of example, with reference to Room A in FIG. 1, assume that a legitimate occupant of the property 101 has just purchased a new oven 151. Because the oven 151 is a new device, the local audio tones database maintained by the monitoring system control unit 110 does not include any records with audio fingerprints corresponding to respective sets of audio tones such as a set of audio tones 151a that can be output by the oven 151. In some implementations, the monitoring system 100 is configured to learn each respective set of audio tones such as the set of audio tones 151a that may be output by oven 151.

In some implementations, a legitimate occupant 102 of the property 101 may provide an input to the oven 151 that instructs the oven to begin preheating to a particular temperature. For example, the legitimate occupant 102 may set the oven 151 to "bake" and "350 degrees" Fahrenheit. The oven 151 may output a set of audio tones in response to the oven 151 determining that the oven has reached the preheated temperature of "350 degrees" Fahrenheit. For example, the oven 151 may output a set of audio tones 151a once the oven has been preheated.

The microphone 110a of the monitoring system control unit 110 can obtain a recording of sound data from Room A for the period of time when the set of audio tones 151a where output by the oven 151. The monitoring system control unit 110 can determine whether the recording of sound data includes a set of audio tones such as audio tones 151a generated by a speaker of a device such as the oven 151. Determining whether the recording of sound data includes a set of audio tones may include providing the recording of sound data to a machine learning model that has been trained to predict the likelihood that a recording of captured sound data includes a set of audio tones. For example, the machine learning model may process the recording of sound data, and generate an output score (e.g., a probability) indicative of whether or not the sound data from Room A includes a set of audio tones. In this example, the machine learning model generates an output score, based on processing the recording of sound data from Room A, and the machine learning model determines that the output score satisfies a predetermined threshold. As a result, the monitoring system control unit 110 can conclude that the recording of sound data includes the set of audio tones 151.

The monitoring system control unit 110 may generate an audio fingerprint for the set of audio tones 151a. The monitoring system control unit 110 can perform a search of a local audio fingerprint database and determine that the local audio fingerprint database does not include a record that is associated with the audio fingerprint that was generated based on the set of audio tones 151a. In response to determining that the local audio fingerprint database does not include a record that is associated with the audio fingerprint that was generated based on the set of audio tones 151a, the monitoring system control unit 110 may perform one or more operations to learn the audio fingerprint that was generated for the set of audio tones 151a.

In some implementations, in response to determining that the local audio fingerprint database does not include a record that is associated with the audio fingerprint that was generated based on the set of audio tones 151a, the monitoring system control unit 110 may generate a notification that includes (i) a message alerting a legitimate property occupant 102 that a new set of audio tones 151 have been detected, (ii) a recording of the detected set of audio tones 151, and (iii) a prompt for information about the set of audio tones 151 in the recording. The prompt may ask the user to input (i) a device identifier (e.g., oven, microwave, washer, dryer, laptop_son, laptop_dad, smoke_detector_RM, or the like), (ii) a meaning for the set of audio tones 151 (e.g., a device state such as oven is preheated, microwave finished heating, wash cycle complete, dry cycle complete, laptop battery low, email received, check smoke detector battery, or the like), or (iii) both.

The monitoring system control unit 110 may transmit the notification to a user device 104 of a legitimate property occupant 102 using the network 140. The legitimate property occupant 102 can view the notification and instruct the user device 104 to playback an audio recording of the set of audio tones 151a attached to the received notification. The user device 104 can receive input to one or more fields of a user interface related to (i) a device identifier, (ii) a meaning for the set of audio tones 151a, or (iii) both in response to the prompt provided in the notification. The input received by the user device 104 can be transmitted to the monitoring system control unit 110 using the network 140. The monitoring system control unit 110 can update a local database of audio fingerprints using the data received from the user device 104. Updating the local database of audio fingerprints may include, for example, creating a record in the local database of audio fingerprints that corresponds to the audio fingerprint for the recording and includes the set of tones 151a based on the feedback (e.g., device identifier, meaning of the set of audio tones, or both) received from the user device 104.

Then, when the oven 151 subsequently outputs the set of audio tones 151a, the monitoring system control unit 110 can capture sound data that includes the set of audio tones 151a, generate an audio fingerprint based on the set of audio tones 151a, identify a record in the local database of audio fingerprints based on the set of audio tones 151a, and generate a notification to the user indicating that the oven has finished preheating.

The example of a monitoring system control unit 110 learning the meaning of a set of audio tones 151a based on user feedback that is described above is one example of how the monitoring system control unit 110 can learn the meaning of a set of audio tones 151a. Alternatively, or in addition, the monitoring system control unit 110 can also learn the meaning of a set of audio tones 151a by performing a second search of one or more remote databases of audio fingerprints after determining that the first search of the local audio fingerprint database does not include any records responsive to the audio fingerprint search.

In some implementations, the monitoring application server 190 (or other remote server) may include a global library of audio fingerprints that is aggregated from each of the plurality of properties subscribed to, or otherwise associated with, the monitoring system services offered by the monitoring application server 190. The monitoring system control unit 110 can search the remote database of aggregated audio fingerprints to determine if any audio fingerprint records match the newly detected and unknown audio fingerprint that was generated based on the set of audio tones 151a detected from the new oven 151. If a matching audio fingerprint is found in the remote database of aggregated audio fingerprints, the monitoring system control unit 110 can download the record that is associated with the matching audio fingerprint and use the downloaded record to update the monitoring system control unit's 110 local database of audio fingerprints. The downloaded record may include data that establishes a mapping of the detected audio fingerprint to one or more of (i) a device identifier, (ii) a meaning for the set of audio tones, or the like.

Then, when the oven 151 subsequently outputs the set of audio tones 151a, the monitoring system control unit 110 can capture sound data that includes the set of audio tones 151a, generate an audio fingerprint based on the set of audio tones 151a, identify a record in the local database of audio fingerprints based on the set of audio tones 151a, and generate a notification to the user indicating that the oven has finished preheating.

Other types of listening devices other than a microphone 110a of a monitoring system control 110 may be used to detect a set of audio tones. By way of example, with reference Room B of FIG. 1, a device such as a laptop 152 may have a battery that is dying. Once the laptop's 152 battery life falls below a predetermined threshold, the laptop 152 may output a set of audio tones 152a. A listening device such as a microphone 133a of a camera 133 may capture sound data that includes the set of audio tones 152a. The listening device may transmit the detected sound data (or other data representing the detected sound data such as an audio fingerprint) 172 via one or more networks to a monitoring system control unit 110 (or to the monitoring application server 190) for analysis. The sound data (or other data representing the detected sound such as an audio fingerprint) 172 may be transmitted over a wireless portion of local network 140 or a wired portion of local network 140.

The monitoring system control unit 110 (or monitoring application server 190) may determine whether the sound data includes a set of audio tones 152a generated by a speaker of a device such as a laptop 152. In response to determining that the sound data includes a set of audio tones 152a, the monitoring system control unit 110 may generate an audio fingerprint for the set of audio tones 152a. The monitoring system control unit 110 can perform a search of a local audio fingerprint database and determine that the local audio fingerprint database includes an audio fingerprint record that corresponds to the audio fingerprint generated based on the set of audio tones 152a. The monitoring system control unit 110 can obtain (i) a device identifier, (ii) a meaning of the set of one or more audio tones 152a, or (iii) both, from the local audio fingerprint database. For example, the monitoring system control unit 110 can obtain a device identifier such as "laptop_dad" and a meaning such as "low battery." The monitoring system control unit 110 can generate and transmit a notification based on the data obtained from the local audio fingerprint library. For example, the monitoring system control unit 110 can generate and transmit a notification to user device 104 to alert the legitimate occupant 102 of the property 101 to the fact that Dad's Laptop is running low on battery. This can provide an opportunity for the legitimate occupant 102 of the property 101 to plug in the laptop 152 so that the laptop is available for use when needed.

In some implementations, the monitoring system control unit 110 may also be able to determine the location of the device that generated a detected set of audio tones. For example, each microphone may communicate with the monitoring system control unit 110 over a particular channel. In such implementations, the monitoring system control unit 110 can identify the location of a set of audio tones based on the channel on which the set of audio tones (or other data representing the detected sound such as an audio fingerprint) was detected. In the example of Room B, the monitoring system control unit 110 may determine that the channel upon which the sound data (or other data representing the detected sound data such as an audio fingerprint) 172 was received corresponds to the camera 133 in Room B. Thus, the notification generated and transmitted to a user device 104 may alert the legitimate occupant 102 of the property 101 that Dad's Laptop in Room B is running low on battery. This can assist the legitimate occupant to find and charge Dad's Laptop more efficiently.

Other implementations may use other methods for determining the location of a device that generated a detected set of audio tones. For example, in some implementations, the listening device that transmits sound data (or other data representing the detected sound data such as an audio fingerprint) 172 to a monitoring system control unit 110 may also transmit a speaker identifier. In such instances, the monitoring system control unit 110 may determine the location of the speaker that detected the set of audio tones based on the speaker identifier. Then, the monitoring system control unit 110 can determine that the device that generated the set of audio tones is located in the vicinity of the speaker location. In yet another alternative, the location of a device may be determined based on a device's identifier that is stored in the audio fingerprint database (e.g., Room D Smoke Detector).

In some implementations, multiple devices may be generating a respective set of audio tones at the same time. For example, a washer 153 and a dryer 154 may each output a respective set of audio tones 153a, 154a at the same time (or at substantially the same time such that at least a portion of each respective set of audio tones 153a, 154a are overlapping. In such instances, the monitoring system control unit 110 (or monitoring application server 190) may perform one or more operations to disambiguate the overlapping sounds.

By way of example, the respective sets of audio tones includes a first set of audio tones 153a and a second set of audio tones 154a. The first set of audio tones 153a and the second set of audio tones 154a may each be detected by a listening device such as the microphone 167 in the second 120g. The captured sound data that includes the first set of audio tones 153a and a second set of audio tones 154a may be disambiguated based on the characteristics of the respective sets of audio tones 153a, 154a. This because though the first set of audio tones 153a and a second set of audio tones 154a may be overlapping, each respective set of audio tones has their own unique characteristics. For example each set of audio tones 153a, 154a may each be associated with a different frequency. The monitoring system control unit 110 (or monitoring application server 190) may then isolate each set of audio tones 153a, 154b based on the frequency of each respective set of audio tones. Once the audio tones 153a, 154b are disambiguated (e.g., isolated), the monitoring system control unit 110 can perform the operations identified above to identify the device that generated the respective disambiguated sets of audio tones, determine the meaning associated with each respective set of disambiguated audio tones, or both. Then, the monitoring system can perform one or more operations such as notifying a legitimate occupant 102 of the property 101 of the detected set of audio tones and their respective meaning, as described above.

In yet another example, with reference to Room D of FIG. 1, a sensor such as a smoke detector 120c can have a battery that is running low. In response to the smoke detector 120c determining that the smoke detector's 120c batter is low, the smoke detector may generate the set of audio tones 156a. A listening device such as a microphone 104a of a user device 104 may capture sound data and determine that the sound data includes the set of audio tones 156a generated by the speaker of a device such as the smoke detector 120c. The listening device may transmit the detected sound data (or other data representing the detected sound data such as an audio fingerprint) via one or more networks to a monitoring system control unit 110 (or to the monitoring application server 190) for analysis via the network 140.

The monitoring system control unit 110 (or monitoring application server 190) may determine whether the sound data received from the user device 104 includes a set of audio tones 156a. In response to determining that the sound data includes a set of audio tones 156a, the monitoring system control unit 110 may generate an audio fingerprint for the set of audio tones 156a. The monitoring system control unit 110 (or monitoring application server 190) can perform a search of a local audio fingerprint database and determine that the local audio fingerprint database includes an audio fingerprint record that corresponds to the audio fingerprint generated based on the set of audio tones 156a. The monitoring system control unit 110 can obtain (i) a device identifier (e.g., Room D smoke detector), (ii) a meaning of the set of one or more audio tones 156a (e.g., Smoke Detector Battery Low), or (iii) both, from the local audio fingerprint database. The monitoring system control unit 110 (or monitoring application server 190) can generate and transmit a notification based on the data obtained from the local audio fingerprint library. For example, the monitoring system control unit 110 (or monitoring application server 190) can generate and transmit a notification to user device 104 to alert the legitimate occupant 102 of the property 101 to the fact that the Smoke Detector Battery in Room D is running low. This can provide an opportunity for the legitimate occupant 102 of the property 101 to change the battery in the smoke detector 120c.

Alternatively, in some implementations, the user device 104 may also perform analysis of the sound data described as being performed by the monitoring system control unit 110 below. For example, the user device 104 may store an audio fingerprint database locally, or have access to an audio fingerprint database stored remotely from the user device 104 on the monitoring system control unit 110, monitoring application server 190, or other serer. In such instances, the user device may use one or more machine learning models to determine whether captured sound data includes a set of audio tones, generate an audio fingerprint based on a detected set of audio tones, search an audio fingerprint database, and perform one or more of the operations described herein based on the results of the search (e.g., generate a notification, update an audio fingerprint database, instruct a monitoring system component to perform an action (e.g., turn on light), or the like).

In yet another example, with reference to the garage of FIG. 1, a sensor 120j may be integrated into the monitoring system 100 based on generated set of audio tones 157a output by the sensor 120j. For example, the sensor 120j may include a garage sensor 120j that "chimes" when an entity such as a person, vehicle, or the like passes through the entry way to the garage. A listening device such as a microphone 160a of a device such as a home assistant 160 may capture sound data that includes the set of audio tones 157a. The listening device may transmit the detected sound data (or other data representing the detected sound data such as an audio fingerprint) 174 via one or more networks to a monitoring system control unit 110 (or to the monitoring application server 190) for analysis via the network 140. The sound data (or other data representing the detected sound such as an audio fingerprint) 174 may be transmitted over a wireless portion of local network 140 or a wired portion of local network 140.

The monitoring system control unit 110 (or monitoring application server 190) may determine whether the sound data 174 received from the home assistant 160 includes a set of audio tones 157a. For example, the monitoring system control unit 110 (or monitoring application server 190) can use one or more machine learning models to determine whether the received sound data includes a set of audio tones 157a such as a "chime" generated by a speaker of a device such as a sensor 120j. In response to determining that the sound data 174 includes a set of audio tones 157a, the monitoring system control unit 110 (or monitoring application server 190) may generate an audio fingerprint for the set of audio tones 157a. The monitoring system control unit 110 (or monitoring application server 190) can perform a search of a local audio fingerprint database and determine that the local audio fingerprint database includes an audio fingerprint record that corresponds to the audio fingerprint generated based on the set of audio tones 157a.

The monitoring system control unit 110 (or monitoring application server 190) can obtain (i) a device identifier (e.g., Garage Door Chime Sensor), (ii) a meaning of the set of one or more audio tones 156a (e.g., Entity Has Entered Garage Door), or (iii) both, from the local audio fingerprint database. The monitoring system control unit 110 can generate and transmit a notification based on the data obtained from the local audio fingerprint library. For example, the monitoring system control unit 110 (or monitoring application server 190) can generate and transmit a notification to user device 104 to alert the legitimate occupant 102 of the property 101 to the fact that that some entity has entered the garage door. Alternatively, or in addition, the monitoring system control unit 110 (or monitoring application server 190) can perform one or more other operations. For example, based on the monitoring system control unit's 110 (or monitoring application server 190) determination that an entity has entered the garage, the monitoring system control unit 110 (or monitoring application server 190) can instruct one or more lights such as light 166 in the property 101 to turn on.

Other alternatively implementations of the monitoring system 100 may be employed. For example, in some implementations, a listening device may only capture sound data that includes a portion of a set of audio tones. Then, an audio fingerprint may be generated based on a portion of a set of audio tones and may not sufficiently match a corresponding audio fingerprint stored in an audio fingerprint stored in an audio fingerprint database. In such instances, a machine learning model may be used that has been trained to identify partial sets of audio tones. Such a machine learning model may be trained using training data that each include a partial set of audio tones with a label identifying a set of audio tones type (e.g., Dad's laptop low battery chime, Room D smoke detector low battery chime, dishwasher wash cycle complete chime, oven preheat chime, etc.). The output of the machine learning model may provide a probability that the partial set of audio tones input into the machine learning model includes a particular set of audio tones type. The machine learning model may include a neural network.

In some implementations, the monitoring system 100 described above may include a local monitoring unit such as a monitoring system control unit 110. In such instances, the monitoring system control unit 110 may perform one or more of the operations described above locally and also communicate with a monitoring application server 190, which may perform one or more of the operations described above. However, the present disclosure is not limited to having a local monitoring unit. For example, any of the functionality described above—with the exception of a microphone 110a of the monitoring system control unit 110 capturing sound data at the property 101—as being performed by the local monitoring unit 110 may also be performed by a cloud-based monitoring unit comprising one or more servers such as the monitoring application server 190. With reference to the examples that include the microphone 110*a* of the monitoring system control unit 110 capturing sound data at the property 101, an embodiment that does not include a local monitoring unit can rely on any other listening device at the property to provide the monitoring application server 190 with detected sound data.

Figure 2:
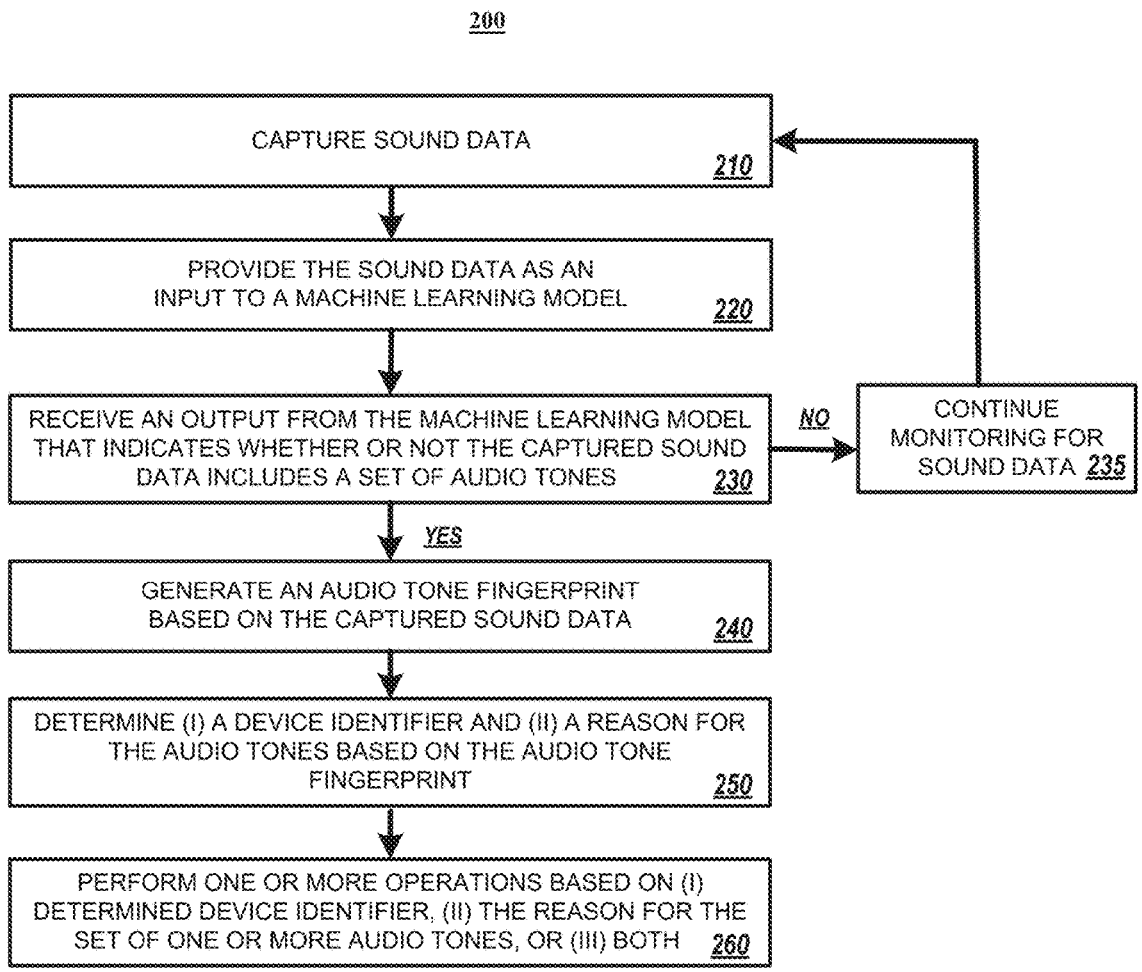
FIG. 2 is a flowchart of an example of a process for detecting and interpreting audio tones.

FIG. 2 is a flowchart of an example of a process 200 for detecting and interpreting audio tones. Generally, the process 200 may include capturing sound data (210), providing the sound data as an input to machine learning model (220), and receiving an output from the machine learning model that indicates whether or not the detected sound data includes a set of audio tones (230). In response to receiving an output from the machine learning model that indicates that the captured sound data likely does not include a set of audible tones, the process 200 may continue at stage (235) by continuing to monitor a property for a set of audio data (235). In response to receiving an output from the machine learning model that indicates that the captured sound data likely includes a set of audible tones, the process 200 may continue at stage (240) by generating an audible tone fingerprint based on the received audio data (240), determining (i) a device identifier and (ii) a reason for the audible tones based on the audible tone fingerprint (250), and performing one or more operations based on (i) the determined device identifier, (ii) the reason for the set of one or more audible tones, or (iii) both (260). For convenience, the process 200 will be described in more detail below as being performed by a monitoring unit such as a monitoring system control unit 110 or monitoring application server 190 of FIG. 1.

In more detail, a monitoring unit can capture 210 sound data. For example, a listening device can use a microphone can be used to record sounds that occur in one or more portions of the property.

The monitoring unit can provide 220 the sound data as an input to machine learning model. For example, in some implementations, the monitoring unit provides the sound data as an input to a machine learning model that has been trained to determine whether a captured recording of sound data include a set of audio tones. The machine learning model may include a neural network.

The monitoring unit can receive 230 an output from the machine learning model that indicates whether or not the captured sound data includes a set of audio tones. The output of the machine learning model may include, for example, a probability that is indicative of whether the captured sound data include a set of audio tones.

In response to receiving an output from the machine learning model that indicates that the captured sound data likely does not include a set of audible tones, the monitoring unit can continue to monitor 335 a property for sound data. For example, the monitoring unit can continue capture (or receive) sound data and analyzing the sound data to determine whether the captured sound data includes a set of audio tones by performing the stages 210, 220, and 230 repeatedly.

In response to receiving an output from the machine learning model that indicates that the captured sound data likely includes a set of audible tones, the monitoring unit can generate 240 an audible tone fingerprint based on the captured sound data. The audio fingerprint may include a representation of the captured sound data that can be used to search a database of audio fingerprints. The fingerprint for a recording of the captured sound data that includes a set of audio tones can be based on, for example, (i) the frequency/pattern of the set of audio tones in the captured sound data, (ii) the loudness of the set of audio tones in the captured sound data, (iii) a duration/pattern of the audio tones (e.g., 250 ms at 100 Hz, ~55 dB, 250 ms silent, 250 ms at 110 Hz, etc.) in the captured sound data, or a combination thereof.

The monitoring unit can determine 250 (i) a device identifier and (ii) a reason for the audible tones based on the audible tone fingerprint. For example, the monitoring unit can perform a search of one or more audio tone databases based on the audio fingerprint generated at stage 240 to identify one or more records that are associated with an audio fingerprint that matches the audio fingerprint generated at stage 240 within a predetermined amount of error. The system may determine the (i) device identifier and (ii) a reason for the set of one or more audible tones based on the audible tone fingerprint by accessing the associated with a record retrieved responsive to the search of the audio tone database.

The monitoring unit can perform 260 one or more operations based on (i) the determined device identifier, (ii) the reason for the set of one or more audible tones, or (iii) both. For example, the monitoring unit may generate and transmit a notification to a user device that includes an alert notifying the user of the reason for the set of one or more audible tones. Alternatively, or in addition, the monitoring unit may instruct one or components to of a monitoring system to perform an operation in response to the detected set of audio tones. For, example, the monitoring unit may instruct a light to turn on in response to the detection of a set of audio tones, the monitoring unit may instruct a camera to capture image data (e.g., still images, video images, or both) in response to a set of audio tones, the monitoring unit may instruct a thermostat to adjust in response to a set of audio tones, or the like.

Figure 3:
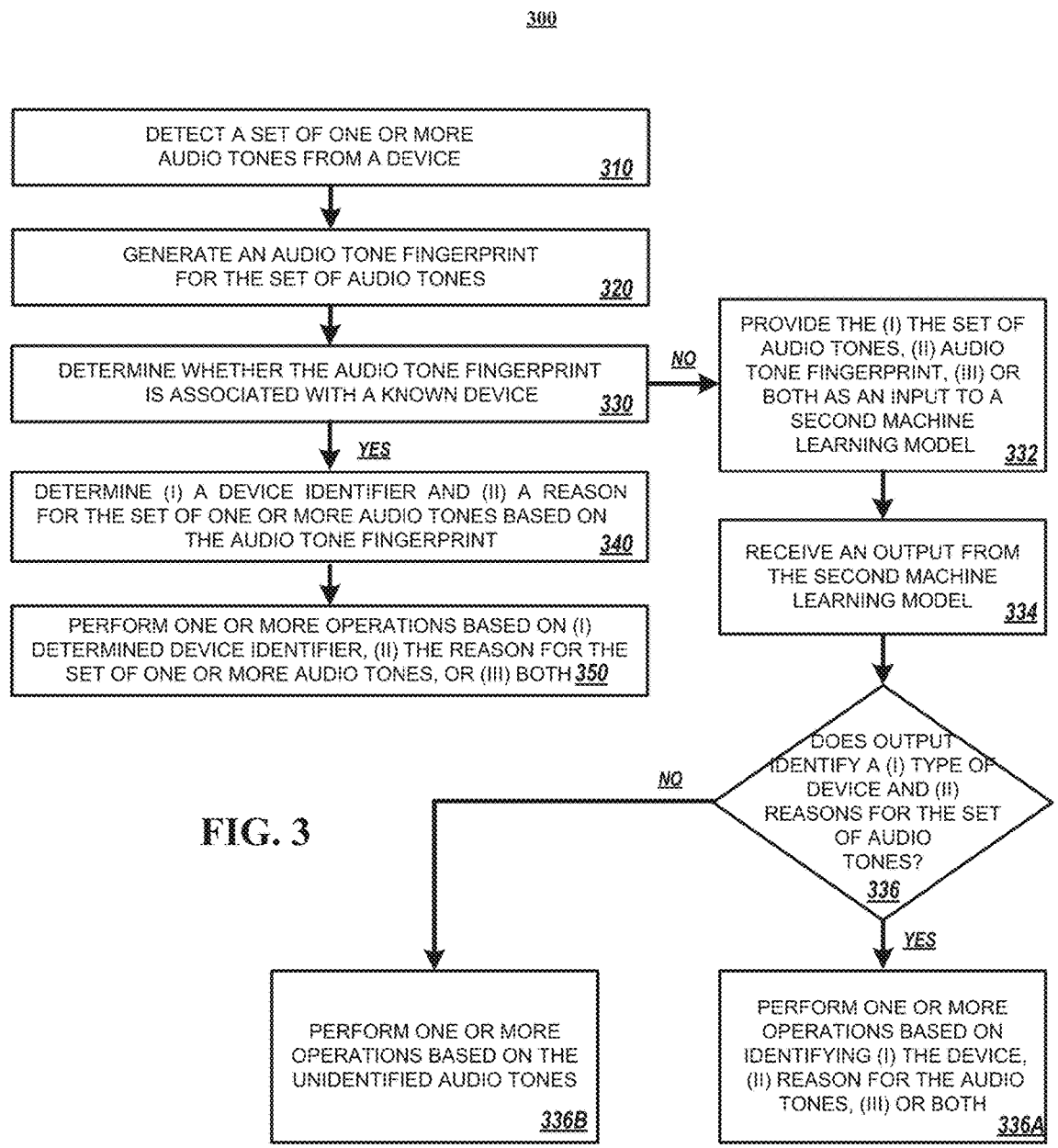
FIG. 3 is a flowchart of an example of another process for detecting and interpreting audio tones.

FIG. 3 is a flowchart of an example of another process 300 for detecting and interpreting audio tones. Generally, the process 300 may include detecting a set of one or more audible tones (310), generating an audible tone fingerprint for the set of audible tones (320), and determining whether the audible tone fingerprint is associated with a known device (330). In response to determining that the audible tone fingerprint is associated with a known device, then the process 300 may continue at stage 340 by determining (i) a device identifier and (ii) a reason for the set of one or more audible tones based on the audible tone fingerprint (340) and performing one or more operations based on (i) the determined device identifier, (ii) the reason for the set of one or more audible tones, or (iii) both (350). Alternatively, in response to determining that the audible tone fingerprint is not associated with a known device, then the process 300 may continue at stage 332 by providing the (i) the set of audible tones, (ii) audible tone fingerprint, (iii) or both as an input to a machine learning model (332) and receiving an output from the machine learning model. At stage 336, the process 300 includes determining whether the output from the machine learning model identifies (i) a type of device and (ii) reasons for the set of audible tones. In response to determining that the output from the machine learning model identifies (i) a type of device and (iii) a reason for the set of audible tones, then process continues at stage 336A by performing one or more operations based on (i) the determined device identifier, (ii) the reason for the set of audible tones, or (iii) both (336). Alternatively, in response to determining whether the output from the machine learning model does not identify (i) a type of device and (ii) a reason for the set of audible tones, then the process may continue at stage 336B by performing one or more operations based on determining that the set of audible tones are unidentified.

For convenience, the process 300 will be described in more detail below as being performed by a monitoring unit such as a monitoring system control unit 110 or monitoring application server 190 of FIG. 1.

In more detail, a monitoring unit can detect 310 a set of one or more audible tones. For example, the monitoring unit can determine that a captured set of sound data include a set of one or more audible tones. In some implementations, the monitoring unit determine that a captured set of sound data includes a set of one or more audible tones using a first machine learning model. For example, the monitoring unit may provide captured sound data as an input to a first machine learning model that has been trained to determine whether captured sound data includes a set of one or more audible tones. In such implementations, the monitoring can determine, based on the output of the first machine learning model, whether or not the sound data includes a set of one or more audible tones.

A monitoring unit can generate 320 an audible tone fingerprint for the set of audible tones. The audio fingerprint may include a representation of the captured sound data that can be used to search a database of audio fingerprints. The fingerprint for a recording of the captured sound data that includes a set of audio tones can be based on, for example, (i) the frequency/pattern of the set of audio tones in the captured sound data, (ii) the loudness of the set of audio tones in the captured sound data, (iii) a duration/pattern of the audio tones (e.g., 250 ms at 100 Hz, ~55 dB, 250 ms silent, 250 ms at 110 Hz, etc.) in the captured sound data, or a combination thereof.

A monitoring unit can determine 330 whether the audible tone fingerprint is associated with a known device. For example, the monitoring unit can perform a search of one or more audio databases based on the audio fingerprint generated at stage 240 to identify one or more records that are associated with an audio fingerprint that matches the audio fingerprint generated at stage 240 within a predetermined amount of error. If one or more records are identified responsive to the search, then the monitoring unit can determine that the audible tone fingerprint is associated with a known device (e.g., the device identified by the device identifier of the record that is responsive to the search). Alternatively, if one or more records are not identified responsive to the search, then the monitoring unit can determine that the audible tone fingerprint is not associated with a known device.

In response to determining that the audible tone fingerprint is associated with a known device, then the process 300 may continue at stage 340 by determining (i) a device identifier and (ii) a reason for the set of one or more audible tones based on the audible tone fingerprint (340). The system may determine the (i) device identifier and (ii) a reason for the set of one or more audible tones based on the audible tone fingerprint by accessing the associated with a record retrieved responsive to the search of the audio tone database.

The monitoring unit can perform 350 one or more operations based on (i) the determined device identifier, (ii) the reason for the set of one or more audible tones, or (iii) both (350). For example, the monitoring unit may generate and transmit a notification to a user device that includes an alert notifying the user of the reason for the set of one or more audible tones. Alternatively, or in addition, the monitoring unit may instruct one or components to of a monitoring system to perform an operation in response to the detected set of audio tones. For, example, the monitoring unit may instruct a light to turn on in response to the detection of a set of audio tones, the monitoring unit may instruct a camera to capture image data (e.g., still images, video images, or both) in response to a set of audio tones, the monitoring unit may instruct a thermostat to adjust in response to a set of audio tones, or the like.

Alternatively, in response to determining that the audible tone fingerprint is not associated with a known device, then the process 300 may continue at stage 332 by providing the (i) the set of audible tones, (ii) audible tone fingerprint, (iii) or both as an input to a second machine learning model. The second machine learning model may be different than the first machine learning model identified above. The second machine learning model may include a neural network. In some implementations, an audible tone fingerprint may not be associated with a known device if the device is a new device that was not previously registered with the monitoring system. Alternatively, an audible tone fingerprint may be determined to not be associated with a known device if the audible tone fingerprint is only an audible tone fingerprint of a portion of a set of one or more audible tones.

The monitoring unit can receive 334 an output from the second machine learning model. For example, the output from the second machine learning model may include a likelihood that a received set of audio tones were generated by a particular device (e.g., dishwasher, oven, smoke detector, or the like), generated for a particular reason (e.g., wash cycle is finished, oven is preheated, smoke detector battery is low, or the like), or a combination of both.

The monitoring unit can then determine at stage 336 whether the output from the machine learning model identifies (i) a type of device and (ii) reasons for the set of audible tones. For example, the monitoring unit can determine, whether the likelihood that a received set of audio tones were generated by a particular device, generated for a particular reason, or both, satisfies a predetermined threshold.

In response to the monitoring unit determining that the output from the machine learning model identifies (i) a type of device and (iii) a reason for the set of audible tones, then the monitoring unit can perform 336A one or more operations based on (i) the determined device identifier, (ii) the reason for the set of audible tones, or (iii) both (336). For example, the monitoring unit may generate and transmit a notification to a user device that includes an alert notifying the user of the reason for the set of one or more audible tones. Alternatively, or in addition, the monitoring unit may instruct one or components to of a monitoring system to perform an operation in response to the detected set of audio tones. For, example, the monitoring unit may instruct a light to turn on in response to the detection of a set of audio tones, the monitoring unit may instruct a camera to capture image data (e.g., still images, video images, or both) in response to a set of audio tones, the monitoring unit may instruct a thermostat to adjust in response to a set of audio tones, or the like.

Alternatively, in response to the monitoring unit determining that the output from the machine learning model does not identify (i) a type of device and (ii) a reason for the set of audible tones, then the monitoring unit can perform one or more operations 336B based on determining that the set of audible tones are unidentified. For example, the monitoring unit can transmit a notification to a user that prompts the user as to whether the user can identify the type of device that generated the set of audible tones, the reason the device generated the set of audible tones, or both. The notification may include the set of audible tones for playback by the user.

Figure 4:
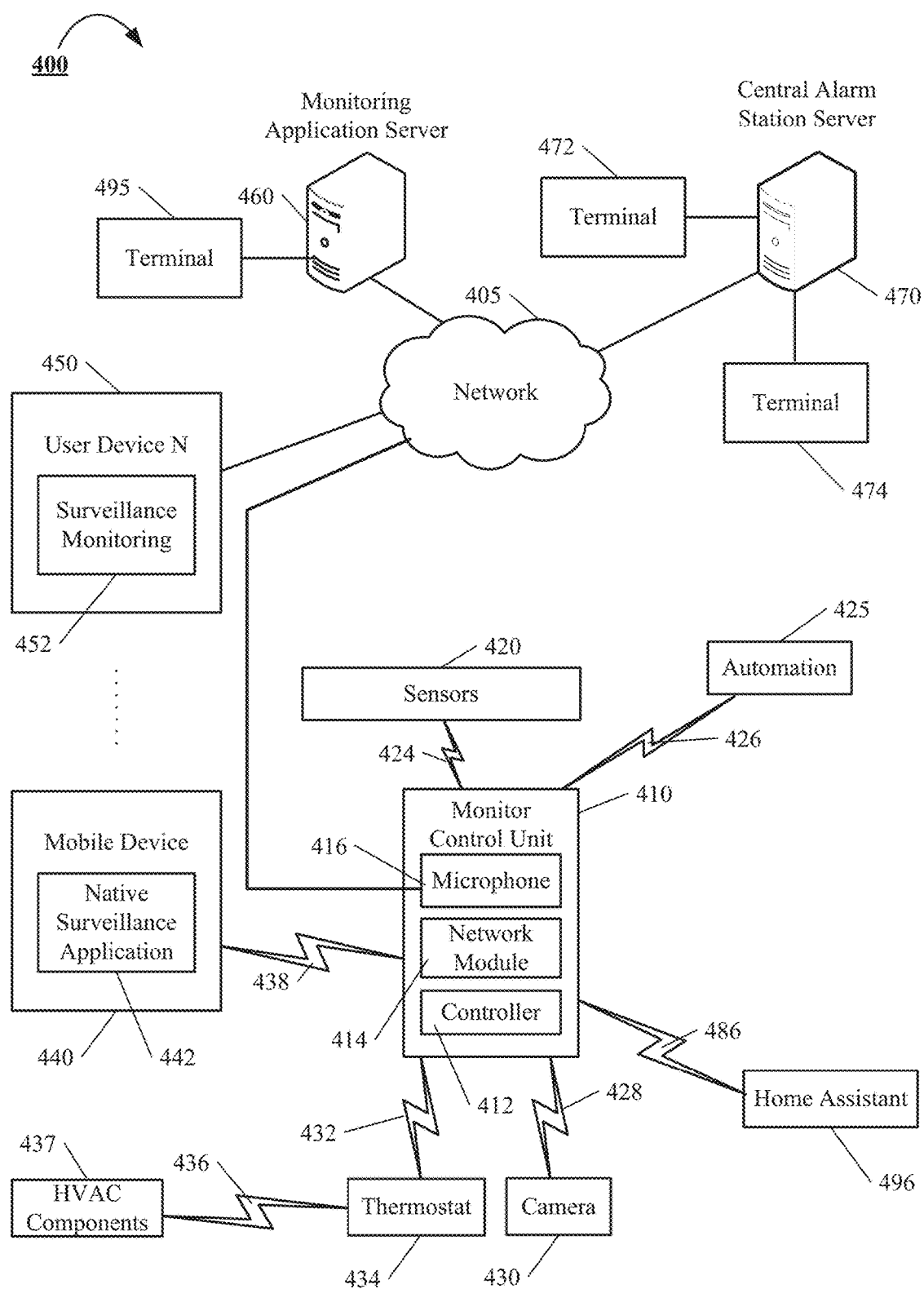
FIG. 4 is a block diagram of components that can be used to implement a monitoring system that detects and interprets audio tones.

FIG. 4 is a block diagram of components that can be used to implement a system that detects and interprets audio tones.

The electronic system 400 includes a network 405, a monitoring system control unit 410, one or more user devices 440, 450, a monitoring application server 460, and a central alarm station server 470. In some examples, the network 405 facilitates communications between the monitoring system control unit 410, the one or more user devices 440, 450, the monitoring application server 460, and the central alarm station server 470.

The network 405 is configured to enable exchange of electronic communications between devices connected to the network 405. For example, the network 405 may be configured to enable exchange of electronic communications between the monitoring system control unit 410, the one or more user devices 440, 450, the monitoring application server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The monitoring system control unit 410 includes a controller 412 and a network module 414. The controller 412 is configured to control a monitoring system (e.g., a home alarm or security system) that includes the monitoring system control unit 410. In some examples, the controller 412 may include a processor or other control circuitry configured to execute instructions of a program that controls operation of an alarm system. In these examples, the controller 412 may be configured to receive input from sensors, detectors, or other devices included in the alarm system and control operations of devices included in the alarm system or other household devices (e.g., a thermostat, an appliance, lights, etc.). For example, the controller 412 may be configured to control operation of the network module 414 included in the monitoring system control unit 410.

The monitoring system control unit 410 may be configured to capture sound data to determine whether the captured sound data includes a set of one or more audio tones. In some implementations, the monitoring system control unit 410 may include a microphone 416. In such instances, the monitoring system control unit 110 may continuously listen for sound data and determine whether the sound data includes a set of audio tones. Alternatively, the monitoring system control unit may periodically capture sound data in 3-second, 5-second, or 10-second increments and analyze the captured audio data to determine if the captured audio data includes a set of audio tones.

In other implementations, the monitoring system control unit 410 may be configured to receive captured sound data from one or more other listening devices of the monitoring system. Other listening devices may include other components of the monitoring system 400 that include a microphone such as a sensor 420, a camera 430, a home assistant 496, a user device 440, 450, or the like. Each listening device may communicate with the monitoring system control unit 410 using a particular channel that can be used to determine the location of the listening device that detected the set of one or more audio tones. This location can be used to determine a likely location of the device that generated the set of one or more audio tones. The channel may be a hardwired channel or a wireless channel.

In some implementations, the monitoring system control unit 410 may provide the sound data captured by the microphone 416 to a machine learning model that has been trained to predict the likelihood that a recording of captured sound data includes a set of audio tones. The machine learning model may include a neural network. The machine learning model may process the captured sound data and generate an output. The output of the machine learning model may include, for example, a probability that the recording of captured sound data that was input into the machine learning model includes a set of audio tones. In some implementations, the machine learning model may be stored on the monitoring system control unit 410. In other implementations, the neural network may accessible by the monitoring system control unit 410 via one or more networks 405.

The monitoring system control unit 110 may be configured to generate audio fingerprints that represent captured sound data, a set of audio tones, or both. In some implementations, the fingerprint for a recording of the captured sound data that includes a set of audio tones can be based on, for example, (i) the frequency/pattern of the set of audio tones in the captured sound data, (ii) the loudness of the set of audio tones in the captured sound data, (iii) a duration/pattern of the audio tones (e.g., 250 ms at 100 Hz, ~55 dB, 250 ms silent, 250 ms at 110 Hz, etc.) in the captured sound data, or a combination thereof. The audio fingerprint may include any representation of the captured sound data that can be used to search a database of audio fingerprints. Though the monitoring system control unit 110 is configured to generate an audio fingerprint, other components of monitoring system control unit 110 such as the monitoring application server 460, the camera 430, the sensor 420, the home assistant 496, the mobile devices 440, 450 capture sound data, determine whether the sound data includes a set of audio tones, and also generate audio fingerprints. Each of the aforementioned component may transmit the audio tone finger prints to the monitoring system control unit 110.

In some implementations, the monitoring system control unit 110 may locally store an audio fingerprint database that can be searched based on a generated audio fingerprint. Alternatively, the monitoring system control unit 110 may access one or more remotely stored audio fingerprint databases. In some implementations, one or more other components of monitoring system 400 may also store an audio fingerprint database. For example, one or more of the monitoring application server 460, the camera 430, the sensor 420, the home assistant 496, or the mobile devices 440, 450 may store, or have access to, an audio fingerprint database.

In addition to the functionality above, the monitoring system control unit 410 may also perform all of the functionality described with reference to the monitoring system control unit 110 of FIG. 1 and the processes 200 and 300 described with reference to FIGS. 2 and 3.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the monitoring system control unit 410 to communicate over a local area network and/or the Internet. The network module 414 also may be a voiceband modem configured to enable the alarm panel to communicate over the telephone lines of Plain Old Telephone Systems (POTS).

The monitoring system that includes the monitoring system control unit 410 includes at least one sensor 420. In some implementations, the monitoring system may include multiple sensors 420. Each sensor 420 may include at least one sensor (or detector).

The sensor 420 may include a contact sensor, a motion sensor, a glass break sensor, or any other type of sensor included in an alarm system or security system. The sensor 420 also may include an environmental sensor, such as a temperature sensor, a water sensor, a rain sensor, a wind sensor, a light sensor, a smoke detector, a carbon monoxide detector, an air quality sensor, etc. The sensor 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensor units 420 may include a radio-frequency identification (RFID) sensor that identifies a particular article that includes a pre-assigned RFID tag. Each respective type of sensor (or detector) is configured to generate data which can be used to detect a potential event at a property.

One or more of the sensors 420 may be configured to output a set of one or more audio tones. In such instances, the sensor 420 may include speaker. For example, a smoke detector may include a speaker to output a set of one or more audio tones in response to the detection of a change in state of one or more features of the smoke detector. A change in state may include, for example, the smoke detector's battery changing from being charged more than a threshold amount to be charged less than a threshold amount. In response to the smoke detector determining that the smoke detector's battery has fallen below a threshold level, the smoke detector may output a set of one or more audio signals using a speaker. Other sensors 420 may be configured to generate and output a set of one more audio signals in a similar manner in order to provide an indication of a change in state of the sensor.

In some instances, one or more sensors 420 may include a microphone. In such instances, the sensor 420 can use the microphone to function as a listening device. In such instances, the sensor microphone can capture sound data, and transmit the sound data to monitoring unit for analysis via a network such as network 405 as described with reference to FIG. 1. However, not all sensors 420 are required to include a microphone, and in some implementations of the monitoring systems there may not be any sensors 420 that include a microphone. In other implementations, all sensors 420 in a particular monitoring system may include a microphone. In yet other implementations, a subset of sensors 420 in a monitoring system may include a microphone and a subset of the sensors 420 in the monitoring system may not include a microphone.

The system 400 may also include a home assistant 496. The home assistant 496 may include a microphone that can be used to capture sound data. In some implementations, the home assistant 496 can be configured to determine whether captured sound data includes a set of one or more audio tones and analyze the set of one or more audio tones. Alternatively, in other implementations, the home assistant 496 may capture sound data and transmit the sound data to a monitoring system control unit 410.

The camera 430 may be a video/photographic camera or other type of optical sensing device configured to capture images. For instance, the camera 430 may be configured to capture images of an area within a building monitored by the monitoring system control unit 410. The camera 430 may be configured to capture single, static images of the area and also video images of the area in which multiple images of the area are captured at a relatively high frequency (e.g., thirty images per second). The camera 430 may be controlled based on commands received from the monitoring system control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensor 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the module 425, etc.) to improve image quality when the scene is dark. An integrated or separate light sensor may be used to determine if illumination is desired and may result in increased image quality.

The camera 430 may include a microphone that can be used to capture sound data. In some implementations, the camera 430 can be configured to determine whether captured sound data includes a set of one or more audio tones and analyze the set of one or more audio tones. Alternatively, in other implementations, the camera 430 may capture sound data and transmit the sound data to a monitoring system control unit 410 or monitoring application server 460.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the monitoring system control unit 410. The camera 430 may employ a small solar cell to recharge the battery when light is available. Alternatively, the camera 430 may be powered by the controller's 412 power supply if the camera 430 is co-located with the controller 412.

In some implementations, the camera 430 communicates directly with the monitoring application server 460 over the Internet. In these implementations, image data captured by the camera 430 does not pass through the monitoring system control unit 410 and the camera 430 receives commands related to operation from the monitoring application server 460.

The system 400 also includes a thermostat 434 to perform dynamic environmental control at the property. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a property and/or environmental data at a property, e.g., at various locations indoors and outdoors at the property. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the monitoring system control unit 410 and can control the environmental (e.g., temperature) settings based on commands received from the monitoring system control unit 410.

In some implementations, the thermostat 434 is a dynamically programmable thermostat and can be integrated with the monitoring system control unit 410. For example, the dynamically programmable thermostat 434 can include the monitoring system control unit 410, e.g., as an internal component to the dynamically programmable thermostat 434. In addition, the monitoring system control unit 410 can be a gateway device that communicates with the dynamically programmable thermostat 434.

A module 425 is connected to one or more components of an HVAC system associated with a property, and is configured to control operation of the one or more components of the HVAC system. In some implementations, the module 425 is also configured to monitor energy consumption of the HVAC system components, for example, by directly measuring the energy consumption of the HVAC system components or by estimating the energy usage of the one or more HVAC system components based on detecting usage of components of the HVAC system. The module 425 can communicate energy monitoring information and the state of the HVAC system components to the thermostat 434 and can control the one or more components of the HVAC system based on commands received from the thermostat 434.

The sensors 420, the module 425, the camera 430, the thermostat 434, and the home assistant 496 can communicate with the controller 412 over communication links 427, 426, 428, 432, 438, and 486. The communication links 427, 426, 428, 432, 438, and 486 may be a wired or wireless data pathway configured to transmit signals from the sensors 420, the module 425, the camera 430, the thermostat 434, and the home assistant 496 to the controller 412. The sensors 420, the module 425, the camera 430, the thermostat 434, and the home assistant 496 may continuously transmit sensed values to the controller 412, periodically transmit sensed values to the controller 412, or transmit sensed values to the controller 412 in response to a change in a sensed value.

The communication links 427, 426, 428, 432, 438, and 486 may include a local network. The sensors 420, the module 425, the camera 430, the thermostat 434, the home assistant 496, and the controller 412 may exchange data and commands over the local network. The local network may include 802.11 "Wi-Fi" wireless Ethernet (e.g., using low-power Wi-Fi 33 chipsets), Z-Wave, ZigBee, Bluetooth, "HomePlug" or other "Powerline" networks that operate over AC wiring, and a Category 4 (CAT5) or Category 6 (CAT6) wired Ethernet network. The local network may be a mesh network constructed based on the devices connected to the mesh network.

The monitoring application server 460 is an electronic device configured to provide monitoring services by exchanging electronic communications with the monitoring system control unit 410, the one or more user devices 440, 450, and the central alarm station server 470 over the network 405. For example, the monitoring application server 460 may be configured to monitor events (e.g., alarm events) generated by the monitoring system control unit 410. In this example, the monitoring application server 460 may exchange electronic communications with the network module 414 included in the monitoring system control unit 410 to receive information regarding events (e.g., alarm events) detected by the monitoring system control unit 410. The monitoring application server 460 also may receive information regarding events (e.g., alarm events) from the one or more user devices 440, 450.

In some examples, the monitoring application server 460 may route alarm data received from the network module 414 or the one or more user devices 440, 450 to the central alarm station server 470. For example, the monitoring application server 460 may transmit the alarm data to the central alarm station server 470 over the network 405.

The monitoring application server 460 may store sensor and image data received from the monitoring system and perform analysis of sensor and image data received from the monitoring system. Based on the analysis, the monitoring application server 460 may communicate with and control aspects of the monitoring system control unit 410 or the one or more user devices 440, 450.

The monitoring application server 460 may, in some implementations, be configured to perform any of the functionality related to the monitoring system control units 110, 410, the monitoring application server 190, or both,—except using a microphone to capture audio tones because the monitoring application server is not is not located at a property where the sensors reside. However, the monitoring application server can be connected to one or more listening devices that each include a microphone via a network that can capture and related to monitoring application server 460.

The central alarm station server 470 is an electronic device configured to provide alarm monitoring service by exchanging communications with the monitoring system control unit 410, the one or more mobile devices 440, 450, and the monitoring application server 460 over the network 405. For example, the central alarm station server 470 may be configured to monitor alarm events generated by the monitoring system control unit 410. In this example, the central alarm station server 470 may exchange communications with the network module 414 included in the monitoring system control unit 410 to receive information regarding alarm events detected by the monitoring system control unit 410. The central alarm station server 470 also may receive information regarding alarm events from the one or more mobile devices 440, 450 and/or the monitoring application server 460.

The central alarm station server 470 is connected to multiple terminals 472 and 474. The terminals 472 and 474 may be used by operators to process alarm events. For example, the central alarm station server 470 may route alarm data to the terminals 472 and 474 to enable an operator to process the alarm data. The terminals 472 and 474 may include general-purpose computers (e.g., desktop personal computers, workstations, or laptop computers) that are configured to receive alarm data from a server in the central alarm station server 470 and render a display of information based on the alarm data. For instance, the controller 412 may control the network module 414 to transmit, to the central alarm station server 470, alarm data indicating that a sensor 420 detected a door opening when the monitoring system was armed. The central alarm station server 470 may receive the alarm data and route the alarm data to the terminal 472 for processing by an operator associated with the terminal 472. The terminal 472 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more user devices 440, 450 are devices that host and display user interfaces. For instance, the user device 440 is a mobile device that hosts one or more native applications (e.g., the native surveillance application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a native surveillance application 442. The native surveillance application 442 refers to a software/firmware program running on the corresponding mobile device that enables the user interface and features described throughout. The user device 440 may load or install the native surveillance application 442 based on data received over a network or data received from local media. The native surveillance application 442 runs on mobile devices platforms, such as iPhone, iPod touch, Blackberry, Google Android, Windows Mobile, etc. The native surveillance application 442 enables the user device 440 to receive and process image and sensor data from the monitoring system.

The user device 450 may be a general-purpose computer (e.g., a desktop personal computer, a workstation, or a laptop computer) that is configured to communicate with the monitoring application server 460 and/or the monitoring system control unit 410 over the network 405. The user device 450 may be configured to display a surveillance monitoring user interface 452 that is generated by the user device 450 or generated by the monitoring application server 460. For example, the user device 450 may be configured to display a user interface (e.g., a web page) provided by the monitoring application server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440, 450 communicate with and receive monitoring system data from the monitoring system control unit 410 using the communication link 438. For instance, the one or more user devices 440, 450 may communicate with the monitoring system control unit 410 using various wireless protocols such as Wi-Fi, Bluetooth, Z-Wave, ZigBee, HomePlug (Ethernet over powerline), cellular technologies (e.g., 3G, 4G, CAT-M, 5G), or wired protocols such as Ethernet and USB, to connect the one or more user devices 440, 450 to local security and automation equipment. The one or more user devices 440, 450 may connect locally to the monitoring system and its sensors and other devices using local wireless protocols such as Wi-Fi, Bluetooth, Z-Wave, ZigBee, HomePlug (Ethernet over powerline), or cellular technologies (e.g., 3G, 4G, CAT-M, 5G). The local connection may improve the speed of status and control communications because communicating through the network 405 with a remote server (e.g., the monitoring application server 460) may be significantly slower.

Although the one or more user devices 440, 450 are shown as communicating with the monitoring system control unit 410, the one or more user devices 440, 450 may communicate directly with the sensors and other devices controlled by the monitoring system control unit 410. In some implementations, the one or more user devices 440, 450 replace the monitoring system control unit 410 and perform the functions of the monitoring system control unit 410 for local monitoring and long range/offsite communication.

In other implementations, the one or more user devices 440, 450 receive monitoring system data captured by the monitoring system control unit 410 through the network 405. The one or more user devices 440, 450 may receive the data from the monitoring system control unit 410 through the network 405 or the monitoring application server 460 may relay data received from the monitoring system control unit 410 to the one or more user devices 440, 450 through the network 405. In this regard, the monitoring application server 460 may facilitate communication between the one or more user devices 440, 450 and the monitoring system.

In some implementations, the one or more user devices 440, 450 may be configured to switch whether the one or more user devices 440, 450 communicate with the monitoring system control unit 410 directly (e.g., through link 438) or through the monitoring application server 460 (e.g., through network 405) based on a location of the one or more user devices 440, 450. For instance, when the one or more user devices 440, 450 are located close to the monitoring system control unit 410 and in range to communicate directly with the monitoring system control unit 410, the one or more user devices 440, 450 use direct communication. When the one or more user devices 440, 450 are located far from the monitoring system control unit 410 and not in range to communicate directly with the monitoring system control unit 410, the one or more user devices 440, 450 use communication through the monitoring application server 460.

Although the one or more user devices 440, 450 are shown as being connected to the network 405, in some implementations, the one or more user devices 440, 450 are not connected to the network 405. In these implementations, the one or more user devices 440, 450 communicate directly with one or more of the monitoring system components and no network (e.g., Internet) connection or reliance on remote servers is needed.

In some implementations, the one or more user devices 440, 450 are used in conjunction with only local sensors and/or local devices in a house. In these implementations, the system 400 only includes the one or more user devices 440, 450, the sensors 420, the module 425, the camera 430, and the home assistant 496. The one or more user devices 440, 450 receive data directly from the sensors 420, the module 425, the camera 430, and the home assistant 496 and sends data directly to the sensors 420, the module 425, the camera 430, and the homes assistant 496. The one or more user devices 440, 450 provide the appropriate interfaces/processing to provide visual surveillance and reporting.

In some implementations, the one or more user devices 440, 450 may include a microphone that can be used to capture sound data. In some implementations, the user devices 440, 450 can be configured to determine whether captured sound data includes a set of one or more audio tones and analyze the set of one or more audio tones. Alternatively, in other implementations, the one or more user devices may capture sound data and transmit the sound data to a monitoring system control unit 410 or monitoring application server 460.

In other implementations, the system 400 further includes network 405 and the sensors 420, the module 425, the camera 430, the thermostat 434, and the homes assistant 496 are configured to communicate sensor and image data to the one or more user devices 440, 450 over network 405 (e.g., the Internet, cellular network, etc.). In yet another implementation, the sensors 420, the module 425, the camera 430, the thermostat 434, or a component, such as a bridge/router are intelligent enough to change the communication pathway from a direct local pathway when the one or more user devices 440, 450 are in close physical proximity to the sensors 420, the module 425, the camera 430, the thermostat 434, and the home assistant 496 to a pathway over network 405 when the one or more user devices 440, 450 are farther from the sensors 420, the module 425, the camera 430, the thermostat 434, and the home assistant 496. In some examples, the system leverages GPS information from the one or more user devices 440, 450 to determine whether the one or more user devices 440, 450 are close enough to the sensors 420, the module 425, the camera 430, the thermostat 434, or the home assistant 496 to use the direct local pathway or whether the one or more user devices 440, 450 are far enough from the sensors 420, the module 425, the camera 430, the thermostat 434, and the home assistant 496 that the pathway over network 405 is required. In other examples, the system leverages status communications (e.g., pinging) between the one or more user devices 440, 450 and the sensors 420, the module 425, the camera 430, the thermostat 434, or the home assistant 496 to determine whether communication using the direct local pathway is possible. If communication using the direct local pathway is possible, the one or more user devices 440, 450 communicate with the sensors 420, the module 425, the camera 430, the thermostat 434, and the home assistant 496 using the direct local pathway. If communication using the direct local pathway is not possible, the one or more user devices 440, 450 communicate with the sensors 420, the module 425, the camera 430, the thermostat 434, and the home assistant 496 using the pathway over network 405.

The invention claimed is:

1. A monitoring system for monitoring a property, the monitoring system comprising:
   one or more processors; and
   one or more storage devices, the one or more storage devices storing instructions that, when executed by the one or more processors, cause the one or more processors to perform operations comprising:
      obtaining, by the monitoring system, sound data of audio sounds detected by a microphone that is located at the property;
      determining, by the monitoring system, whether the sound data includes data representing one or more audio tones generated by a device;
      based on determining that the obtained sound data includes one or more audio tones generated by a device, generating, by the monitoring system, an audio fingerprint of the sound data;
      generating, by the monitoring system, a query that includes the generated audio fingerprint as a search parameter;
      obtaining, by the monitoring system and in response to the generated query, (i) a device identifier of the device that generated the one or more audio tones and (ii) a state of the device that generated the one or more audio tones; and
      performing, by the monitoring system, one or more operations based on at least one of the device identifier and the state of the device that generated the one or more audio tones.

2. The monitoring system of claim 1, the operations further comprising:
   extracting, by the monitoring system, the one or more audio tones from the sound data.

3. The monitoring system of claim 2, wherein generating, by the monitoring system, an audio fingerprint, of the sound data, comprises:
   generating, by the monitoring system, the audio fingerprint based on one or more of (i) a frequency or pattern of the one or more extracted audio tones, (ii) a loudness of the one or more extracted audio tones, (iii) a duration of each of the one or more extracted audio tones, (iv) a pattern of the one or more extracted audio tones, or (v) a duration and pattern of the one or more extracted audio tones in the obtained sound data.

4. The monitoring system of claim 1, the operations further comprising:

obtaining, by the monitoring system, second sound data of audio sounds detected by a microphone that is located at the property;

determining, by the monitoring system, that the obtained second sound data does not include one or more audio tones generated by a device;

based on determining, by the monitoring system, that the obtained second sound data does not include one or more audio tones generated by a device, obtaining, by the monitoring system, additional sound data of audio sounds detected by the microphone that is located at the property; and determining, by the monitoring system and based on the additional sound data, whether the additional sound data includes one or more audio tones generated by a device.

5. The monitoring system of claim 1, wherein obtaining sound data of audio sounds detected by a microphone that is located at the property comprises recording, using the microphone, audio sounds at the property.

6. The monitoring system of claim 1, wherein obtaining sound data of audio sounds detected by a microphone located at the property comprises receiving, by the monitoring system, a recording of audio sounds that occurred at the property.

7. The monitoring system of claim 1, wherein determining, by the monitoring system, whether the sound data includes data representing one or more audio tones comprises:

providing, by the monitoring system, the sound data as an input to a machine learning model that has been trained to determine whether sound data includes one or more audio tones generated by a device;

receiving, by the monitoring system, an output from the machine learning model that indicates whether the detected sound data includes the one or more audio tones generated by the device; and determining, by the monitoring system and based on the received output from the machine learning model, whether the sound data includes the one or more audio tones generated the device.

8. The monitoring system of claim 1, the operations further comprising:

determining, by the monitoring system, a particular operation to perform based on (i) the device identifier and (ii) the state of the device; and wherein performing one or more operations, by the monitoring system, based on at least one of the device identifier and the state of the device that generated the one or more audio tones comprises:

transmitting, by the monitoring system, a notification that prompts the user to perform the particular operation.

9. The monitoring system of claim 1, the operations further comprising:

determining, by the monitoring system, a particular operation to perform based on (i) the device identifier and (ii) the state of the device; and wherein performing one or more operations, by the monitoring system, based on at least one of the device identifier and the state of the device that generated the one or more audio tones comprises:

transmitting, by the monitoring system, an instruction to a component of the monitoring system to perform the particular operation.

10. The monitoring system of claim 1, wherein determining, by the monitoring system, whether the sound data includes data representing one or more audio tones generated by a device comprises:

determining, by the monitoring system, whether the sound data includes data representing one or more audio tones generated by a speaker of the device.

11. A method for monitoring a property, the method comprising:

obtaining, by the monitoring system, sound data of audio sounds detected by a microphone that is located at the property;

determining, by the monitoring system, whether the sound data includes data representing one or more audio tones generated by a device;

based on determining that the obtained sound data includes one or more audio tones generated by a device, generating, by the monitoring system, an audio fingerprint of the sound data;

generating, by the monitoring system, a query that includes the generated audio fingerprint as a search parameter;

obtaining, by the monitoring system and in response to the generated query, (i) a device identifier of the device that generated the one or more audio tones and (ii) a state of the device that generated the one or more audio tones; and performing, by the monitoring system, one or more operations based on at least one of the device identifier and the state of the device that generated the one or more audio tones.

12. The method of claim 11, the method further comprising:

extracting, by the monitoring system, the one or more audio tones from the sound data.

13. The method of claim 12, wherein generating, by the monitoring system, an audio fingerprint, of the sound data, comprises:

generating, by the monitoring system, the audio fingerprint based on one or more of (i) a frequency or pattern of the one or more extracted audio tones, (ii) a loudness of the one or more extracted audio tones, (iii) a duration of each of the one or more extracted audio tones, (iv) a pattern of the one or more extracted audio tones, or (v) a duration and pattern of the one or more extracted audio tones in the obtained sound data.

14. The method of claim 11, the method further comprising:

obtaining, by the monitoring system, second sound data of audio sounds detected by a microphone that is located at the property;

determining, by the monitoring system, that the obtained second sound data does not include one or more audio tones generated by a device;

based on determining, by the monitoring system, that the obtained second sound data does not include one or more audio tones generated by a device, obtaining, by the monitoring system, additional sound data of audio sounds detected by the microphone that is located at the property; and determining, by the monitoring system and based on the additional sound data, whether the additional sound data includes one or more audio tones generated by a device.

15. The method of claim 11, wherein obtaining sound data of audio sounds detected by a microphone that is located at the property comprises recording, using the microphone, audio sounds at the property.

16. The method of claim 11, wherein obtaining sound data of audio sounds detected by a microphone located at the property comprises receiving, by the monitoring system, a recording of audio sounds that occurred at the property.

17. The method of claim 11, wherein determining, by the monitoring system, whether the sound data includes data representing one or more audio tones comprises:
providing, by the monitoring system, the sound data as an input to a machine learning model that has been trained to determine whether sound data includes one or more audio tones generated by a device;
receiving, by the monitoring system, an output from the machine learning model that indicates whether the detected sound data includes the one or more audio tones generated by the device; and
determining, by the monitoring system and based on the received output from the machine learning model, whether the sound data includes the one or more audio tones generated the device.

18. The method of claim 11, the method further comprising:
determining, by the monitoring system, a particular operation to perform based on (i) the device identifier and (ii) the state of the device; and
wherein performing one or more operations, by the monitoring system, based on at least one of the device identifier and the state of the device that generated the one or more audio tones comprises:
transmitting, by the monitoring system, a notification that prompts the user to perform the particular operation.

19. The method of claim 11, the method further comprising:
determining, by the monitoring system, a particular operation to perform based on (i) the device identifier and (ii) the state of the device; and
wherein performing one or more operations, by the monitoring system, based on at least one of the device identifier and the state of the device that generated the one or more audio tones comprises:
transmitting, by the monitoring system, an instruction to a component of the monitoring system to perform the particular operation.

20. The method of claim 11, wherein determining, by the monitoring system, whether the sound data includes data representing one or more audio tones generated by a device comprises:
determining, by the monitoring system, whether the sound data includes data representing one or more audio tones generated by a speaker of the device.

* * * * *